Patented May 31, 1949

2,471,632

UNITED STATES PATENT OFFICE 2,471,632

RETARDED CEMENT

Norman C. Ludwig, Chicago, Ill., assignor to Universal Atlas Cement Company, a corporation of Indiana No Drawing. Application February 12, 1947, Serial No. 728,207

4 Claims. (Cl. 106—93)

This invention relates to cements having retarded rates of hydration or set, to slurries of such cement, and to the method of making these slurries. The cement with which the invention is concerned is a Portland or Portland-type cement.

Among the objects of the invention is the provision of a cement having a retarded rate of hydration, or a retarded set as it will be hereinafter termed, particularly at elevated temperatures such as are encountered in the cementing of deep wells.

Further objects of the invention reside in the provision of a slurry of the above cement, and in a method of making such slurry.

These and further objects of the invention will be more readily apparent in the following description.

In the cementing of oil wells it is customary to mix a hydraulic cement, for example a Portland or Portland-type cement, with the requisite amount of water to form a pumpable neat slurry, and to pump the mixture into the well and down the hole into the place where it is desired to have it harden. In the present oil well drilling practice, with wells commonly ranging from 6,000 to 12,000 feet or more in depth, high temperatures are encountered at the locations which are to be cemented, and relatively long periods of time are often required to pump the slurry into place. Furthermore, in the customary practice of pumping the cement slurry down through the casing and either forcing it upward around the outer surface of the casing or through perforations in the lower end of the casing into the formation sought to be sealed, the slurry is required to pass through narrow channels and small openings. Successful placement of the slurry, therefore, requires that the slurry shall remain fluid and pumpable at high temperatures for several hours before it begins to harden. However, after the slurry has been pumped into place, it is desirable to have the hydration or set proceed at a rate at which the slurry will attain its final set and develop considerable strength within about 24 hours.

It has been found that Portland and Portland-type cement slurries can be retarded so that they meet all the above requirements for the satisfactory cementing of deep wells and like operations by the addition of oxidized cellulose, sometimes called oxycellulose, (OC) and inorganic salts of oxidized cellulose within certain definite limits. More specifically, the cement and slurry of the present invention contain at least one of the group consisting of oxidized cellulose and inorganic salts of oxidized cellulose within the range of from .03 to .27% by weight of the dry cement. It has been found that when used in hydraulic cement slurries in the above indicated amounts oxidized cellulose and inorganic salts of oxidized cellulose act as retarders at elevated temperatures, the retarding effects becoming marked at 140° F. and continuing up to and including 220° F.

Oxidized cellulose, which is sold commercially in the form of a dry cotton-like fibrous material, is formed by treating cellulose with ordinary oxidizing agents, such as hypochlorite, permanganate, chromic acid, hydrogen peroxide, nitrogen dioxide, and the like. One commercially available oxidized cellulose is prepared by treating cellulose with nitrogen dioxide, $N_2O_4$, such gas being allowed to act upon dried cellulose for a certain length of time. The degree to which the cellulose is oxidized may be controlled by varying either the time in which the gas is in contact therewith or the temperature. The nitrogen dioxide preferentially oxidizes the primary hydroxyl groups of cellulose, changing them to carboxyl groups, the presence of such latter groups appearing to account for the solubility of oxidized cellulose in dilute alkali solution. The various inorganic salts of oxidized cellulose can readily be prepared by treating oxidized cellulose with a solution of a salt of the desired metal and subsequently washing the product with distilled water. Thus, the sodium salt of oxidized cellulose can be made by treating oxidized cellulose with sodium acetate solution followed by washing the product with distilled water. Salts of oxidized cellulose may also be formed by dissolving oxidized cellulose in organic and inorganic bases, the oxidized cellulose reacting as an acid and combining with the bases to form the salt.

The mechanism whereby certain materials retard the rate of hydration of hydraulic cement-water mixtures is not fully understood, but in general it appears that the material must dissolve to some extent in the liquid phase of the cement slurry in order to exert a significant effect upon the rate of hydration. Oxidized cellulose and its monovalent inorganic salts, such as those of sodium, potassium, and ammonium, etc., are soluble in water and thus dissolve in the liquid phase of the cement slurry when employed at elevated temperatures. The divalent and polyvalent salts of oxidized cellulose, however, are insoluble in water but are soluble in weak alkaline solutions, such as the liquid phase of Portland cement, which contains calcium, potassium, and sodium hydroxides. Therefore, the inorganic salts of oxidized cellulose, regardless of the metal valence, dissolve in the hydraulic cement-water mixtures and retard the setting thereof in the same manner as does oxidized cellulose itself.

The cement employed may be any Portland or Portland-type hydraulic cement, the type used depending upon the particular application to be made of the cement or of the slurry, and of the properties demanded by such application, such as setting time, strength of the set slurry, and so forth. In making the test specimens of the cement within the invention, the results of tests on which are set forth below, Portland cements of A. S. T. M. Type II, were employed as indicated. The oxide composition of such cements and the specific surface as determined by the Wagner turbidimetric method are given below:

*Oxide Composition—Per cent*

| Cement | SiO$_2$ | Al$_2$O$_3$ | Fe$_2$O$_3$ | CaO | MgO | MnO | SO$_3$ | Loss on Ignition | Spec. Sur. Wagner Sq.Cm./g. |
|---|---|---|---|---|---|---|---|---|---|
| Type II | 22.0 | 4.6 | 4.5 | 64.1 | 0.96 | 0.16 | 1.7 | 1.3 | 1,185 |

In the tests of cements in accordance with the invention neat slurries containing the indicated type of cement, water, and the indicated additive were made up, the amount of the additive being given in the tables in per cent by weight of the dry cement, there being used in each case 100 parts by weight of the cement and 40 parts by weight of water. This gave slurries which were typical of those employed in oil well cementing operations. The tests included the determination of the stiffening time of slurries at temperatures of 140°, 180°, 200°, and 220° F., the determination of the consistency of the slurries at intervals while stirring, and the determination of compressive strengths of the set and cured cement structure resulting from such slurries.

The stiffening times and the consistencies of the slurries when at temperatures of 140°, 180° and 200° F. were determined by use of an apparatus such as shown in Weiler Patent No. 2,122,765, dated July 5, 1938, which is designed to test stirring or pumpability time of cement slurries at high temperatures. Such device consists essentially of a rotating cylindrical container with an internal paddle assembly fixed to a head whose movement is independent of the container. With the container filled with cement slurry, the force against the paddle due to rotation of the container and the viscosity of the slurry is transferred from the head of the apparatus to a pendulum lever arm by a suitable connection. The pendulum range is graduated from 0 to 10 divisions, representing slurry viscosities of 0 to 100 poises. A pull of 10 divisions on the pendulum is considered to represent the limit of pumpability of the slurry in on oil well. The temperature of the slurry during the test was maintained at the degree indicated by a thermostatically controlled bath surrounding the container. In the following tables stiffening time was taken as the time from initiation of the test in the consistometer until the indicator on the pendulum showed a slurry viscosity of 100 poises.

The determination of the stiffening time of slurries at a temperature of 220° F. was carried out by use of a pressure consistometer such as described in Technical Publication No. 1207 of the American Institute of Mining and Metallurgical Engineers. Such tests were conducted under pressures small enough so that they had little effect on the stiffening times and were sufficient only to prohibit the boiling of the water in the slurry at the constant temperature of 220° F., which, of course, is above the boiling point of water. In such pressure consistometer the cell which contains the slurry is placed in a heated pressure cylinder and petroleum oil is pumped into the cylinder entirely surrounding the cell. At 220° F. it was necessary to subject the slurry to but from two to five pounds per square inch by means of the oil acting through the medium of the neoprene diaphragm interposed between the slurry and the oil. The apparatus works on the same principle as that of the aforementioned Weiler patent, but the standard method for operation of the pressure consistometer, which method was employed in the present tests, specifies a shearing rate of 47 R. P. M. and viscosity of 80 "poises" for termination of the test, such shearing rate being about twice that employed in the Weiler device which as above pointed out, employs a viscosity of 100 poises for termination of the tests therein. At temperatures of 200° F. and lower, final stiffening times on the same slurries in the Weiler device and the pressure consistometer check very closely.

The compressive strengths reported in the tables below were determined by making two-inch cubes which were molded from portions of the various cement slurries. When the molds were filled they were covered with metal plates and placed in the water of temperature baths operating at 140° and 200° F., as indicated. At approximately 20 hours the specimens were removed from the molds and returned to the temperature baths. Three cubes of each slurry were broken at 24 hours, and three were broken at three days, by subjecting them to compression to destruction in a standard compression testing machine.

The oxidized cellulose in the tests described was added to the cement powder in dry form and intermixed by hand, whereas the salts were added to the slurry mixing water in solution form. It is to be understood that either the oxidized cellulose or its salts can be added to the dry cement or to the cement-water mixture, but the more practical way, from a commercial standpoint, is to add the material to the dry cement.

In cement slurries, especially when the slurries are mixed rapidly and consequently with high agitation, oxidized cellulose and its inorganic salts act as foam stabilizing agents and cause the entrainment of a considerable amount of air. In the usual methods of preparing slurries for use in oil wells, therefore, the addition of oxidized cellulose and its inorganic salts may cause foaming and frothing of the slurry, which is generally considered undesirable in oil well cementing operations. Such foaming and frothing of the slurry containing oxidized cellulose and its inorganic salts can be nullified by the use of defoaming agents, such as tributyl phosphate and pine oil. Such defoaming agents, when used, are added in small amounts, from .02 to .05% tributyl phosphate being typical, sufficient to suppress the foaming and frothing tendencies of oxidized cellulose and its inorganic salts on the slurry in the particular slurry mixing and pumping conditions employed. In each of the slurries tested which contained oxidized cellulose and its inorganic salts, .02% tributyl phosphate by weight of the dry cement was added.

In the tables below oxidized cellulose is abbreviated "OC" and the salts of oxidized cellulose are abbreviated with the symbol of the metal, or of the ammonium radical, as the case may be, prefixed to "OC."

TABLE I
Stiffening time at constant temperature

| | Cement | Additive, Per Cent | Stiffening Times at Temperatures Indicated | | | | | | | |
|---|---|---|---|---|---|---|---|---|---|---|
| | | | 140° F. | | 180° F. | | 200° F. | | 220° F. | |
| | | | Hr. | Min. | Hr. | Min. | Hr. | Min. | Hr. | Min. |
| 1 | Type II | None | 3 | 24 | 1 | 50 | 1 | 33 | 1 | 12 |
| 2 | do | OC 0.09 | 13 | 6 | 13 | 30 | 6 | 47 | 2 | 1 |

The stiffening time results given in Table I show that oxidized cellulose which, as will appear, has a very substantial retarding action in the slurry, similar to those of its inorganic salts, over the temperature range of from 140° to 200° F. At temperatures above 200° F., such material retains some of its retarding properties, as indicated by the tests conducted at 220° F., but in general is not as effective at this temperature as at the lower temperatures.

When the slurry is to be employed at relatively low temperatures, such as 140° F., it is possible to employ amounts of oxidized cellulose less than the .09% by weight of the dry cement used in the test in Table I. Where the slurry is to be used at temperatures markedly above 200° F., such as 220° F., it is possible sufficiently to retard the setting of the slurry by the addition of larger amounts of oxidized cellulose and its inorganic salts, so that the slurry may be more applicable to deep well cementing. The following Tables II and III show the effects on the stiffening time of slurries with the addition of varying amounts of oxidized cellulose, at 140° and 220° F., respectively.

TABLE II
Stiffening time at 140° F.

| | Cement | Additive | Stiffening Time at 140° F. | |
|---|---|---|---|---|
| | | | Hr. | Min. |
| 1 | Type II | OC 0.06 | 7 | 54 |
| 2 | do | OC 0.03 | 3 | 58 |

TABLE III
Stiffening time at 220° F.

| | Cement | Additive | Stiffening Time at 220° F. | |
|---|---|---|---|---|
| | | | Hr. | Min. |
| 1 | Type II | OC 0.15 | 2 | 36 |
| 2 | do | OC 0.21 | 3 | 7 |
| 3 | do | OC 0.27 | 3 | 41 |

As pointed out above, it is desirable in oil well cementing and like operations that the slurry remain easily pumpable over extended periods of time, even though it is subjected to high temperatures. The following Table IV gives the results of slurry consistency tests run in the Weiler device at temperatures of 180° and 220° F.

TABLE IV
Slurry consistency at 180° and 200° F.

| | Cement | Additive, Per Cent | Temp., °F. | Consistency in "Poises" at Times Indicated | | | | | |
|---|---|---|---|---|---|---|---|---|---|
| | | | | 15 min. | 30 min. | 1 hr. | 2 hr. | 3 hr. | 4 hr. |
| 1 | Type II | None | 180 | 17 | 14 | 16 | Stiff at 1 hr. 55 min. | | |
| 2 | do | OC 0.09 | 180 | 10 | 18 | 19 | 18 | 20 | 20 |
| 3 | do | None | 200 | 14 | 20 | 22 | Stiff at 1 hr. 33 min. | | |
| 4 | do | OC 0.09 | 200 | 11 | 20 | 24 | 26 | 26 | 26 |

It may be seen from the above Table IV that the slurry employed in making tests 1 and 3, which contained no oxidized cellulose or inorganic salt of oxidized cellulose, hydrated at such rates that in test 1 it had stiffened sufficiently so that it had a consistency of 100 poises at one hour and 55 minutes and that in test 3 it had stiffened sufficiently so that it had a consistency of 100 poises at one hour and 33 minutes, showing that such slurry was unfit for deep well cementing operations at either 180° or 200° F. The slurry employed in both tests 2 and 4, however, retained a consistency far below 100 poises throughout the entire period from the time of mixing to four hours after mixing, showing that such slurry remained pumpable at temperatures of 180° and 200° F. for times which were adequate for cementing deep wells with bottom hole temperatures in this range.

The presence of oxidized cellulose and of inorganic salts of oxidized cellulose in the slurries in amounts within the teaching of the invention does not adversely affect the strength of the cured structure resulting from the slurry when such cement structures are cured for three days either at 140° or 200° F. Furthermore, when cured for 24 hours the strengths of the cement structures containing such additives are little, if any, below those not containing the additives, showing that the structures resulting from the cements of the present invention develop an early strength fully adequate for the purpose in hand. The compressive strengths given in Table V below are the average values for three 2-inch cubes cured and tested as set out above.

TABLE V

| | Cement | Additive, Per Cent | Compressive Strength at Curing Temperature and Age Indicated, p. s. i. | | | |
|---|---|---|---|---|---|---|
| | | | 140° F. | | 200° F. | |
| | | | 24 Hr. | 3 Day | 24 Hr. | 3 Day |
| 1 | Type II | None | 2,843 | 4,879 | 4,140 | 4,712 |
| 2 | do | OC 0.09 | 3,073 | 4,904 | 3,800 | 4,954 |

In order to illustrate the use of typical inorganic salts of oxidized cellulose as set forth above, additional tests to determine the stiffening times of slurries employing as additives the potassium and ammonium salts of oxidized cellulose were made at 200° F. As before, the cement and water employed were in the ratio of 100 to 40 by weight and .02% tributyl phosphate by weight of the dry cement was added to the slurry to prevent foaming. The potassium and ammonium salts of oxidized cellulose were made by dissolving 2½ grams of oxidized cellulose in 100 milliliters of 1% solutions of potassium hydroxide and ammonium hydroxide, respectively.

TABLE VI

| | Cement | Additive, Per Cent | Stiffening Time at 200° F. | |
|---|---|---|---|---|
| | | | Hr. | Min. |
| 1 | Type II | None | 1 | 33 |
| 2 | do | K—OC 0.05 | 3 | 48 |
| 3 | do | K—OC 0.075 | 4 | 7 |
| 4 | do | K—OC 0.100 | 4 | 31 |
| 5 | do | NH₄—OC 0.05 | 4 | 17 |
| 6 | do | NH₄—OC 0.075 | 4 | 57 |
| 7 | do | NH₄—OC 0.100 | 5 | 53 |

The stiffening times at 200° F. given in Table VI above show the effect of such additives in typical oil well cement slurries which would be used for deep well cementing. The results of such tests show that any of the slurries used in tests 2 to 7, inclusive, none of which had a stiffening time under 3¾ hours, are admirably suited for deep well cementing.

Whereas I have disclosed preferred compositions of the cement, cement slurries, and methods of making them it is to be understood that the invention is capable of considerable variation as to details.

I claim:

1. A cement composition adapted when mixed with water to form a slurry having a retarded set at temperatures above atmospheric, said composition comprising Portland cement and from 0.03 to 0.27% by weight of cement of one of the group consisting of dry cellulose oxidized by contact with nitrogen dioxide and inorganic salts of cellulose so oxidized.

2. A cement composition adapted when mixed with water to form a slurry having a retarded set at temperatures above atmospheric, said composition comprising Portland cement and from 0.03 to 0.27% by weight of cement of dry cellulose oxidized by contact with nitrogen dioxide.

3. A cement composition adapted when mixed with water to form a slurry having a retarded set at temperatures above atmospheric, said composition comprising Portland cement and from 0.03 to 0.27% by weight of cement of inorganic salts of dry cellulose oxidized by contact with nitrogen dioxide.

4. A cement slurry having a retarded set at temperatures above atmospheric comprising Portland cement, water and from 0.03 to 0.27 by weight of the dry cement of one of the group consisting of dry cellulose oxidized by contact with nitrogen dioxide and inorganic salts of cellulose so oxidized.

NORMAN C. LUDWIG.

REFERENCES CITED

The following references are of record in the file of this patent:

UNITED STATES PATENTS

| Number | Name | Date |
|---|---|---|
| 2,174,051 | Winkle | Sept. 26, 1939 |
| 2,234,191 | Olze | Mar. 11, 1941 |
| 2,374,628 | Swagze | Apr. 24, 1945 |
| 2,429,211 | Andes | Oct. 21, 1947 |

Certificate of Correction

Patent No. 2,471,632.                                                                                                May 31, 1949.

NORMAN C. LUDWIG

It is hereby certified that errors appear in the printed specification of the above numbered patent requiring correction as follows:

Column 6, line 43, for "220° F." read *200° F.*; column 8, line 38, claim 4, for "0.27" read *0.27%*;

and that the said Letters Patent should be read with these corrections therein that the same may conform to the record of the case in the Patent Office.

Signed and sealed this 1st day of November, A. D. 1949.

[SEAL]

THOMAS F. MURPHY,
*Assistant Commissioner of Patents.*